United States Patent Office 3,489,764
Patented Jan. 13, 1970

3,489,764
RECOVERY OF CYCLOSERINE
John A. Riddick, Terre Haute, Ind., assignor to Commercial Solvents Corporation, New York, N.Y., a corporation of Maryland
No Drawing. Filed May 1, 1967, Ser. No. 634,885
Int. Cl. C07f 1/08; C07d 85/08; A61k 21/00
U.S. Cl. 260—307                                6 Claims

ABSTRACT OF THE DISCLOSURE

A process for the purification of cycloserine by precipitation from an aqueous solution with an insoluble cuprous salt, separation of the precipitated copper cycloserine compound, treating with hydrogen sulfide thereby precipitating copper sulfide, and filtering the solution to produce a solution of purified cycloserine.

Summary of the invention

This invention relates to a process for the recovery of cycloserine. In a particular aspect, it relates to the recovery of cycloserine from aqueous solutions by precipitation as a copper compound.

Cycloserine is a known antibiotic produced by the cultivation of several species of microorganisms, such as *Streptomyces orchidaceus*, for example, when the microorganism is cultivated in a nutrient fermentation medium, e.g. as described by R. L. Harned in U.S. Patent 3,090,730. A process for the recovery of the antibiotic from such a fermentation medium was described by R. L. Harned in U.S. Patent 2,789,983. According to Harned, the cycloserine was recovered by filtering the cells of the microorganism, adsorbing the cycloserine on a strongly basic ion exchange resin, eluting the cycloserine from the resin, precipitating it as a water-insoluble metal salt, decomposing the salt thereby effecting a redissolving of the cycloserine, and recovery of the cycloserine by freeze-drying or crystallization. Water-soluble salts of several metals were described as suitable for precipitating the cycloserine, including silver nitrate, cupric chloride and copper sulfate. Silver nitrate has been successfully used on a commercial scale in this process, but the high initial cost of the silver nitrate, the subsequent high cost of recovery of silver, plus losses during reprocessing have been disadvantageous.

It is an object of this invention to provide a new process for the recovery of cycloserine.

It is a second object of this invention to provide a process for the recovery of cycloserine from aqueous solutions by precipitation of the cycloserine as a copper compound.

Other objects of this invention will be obvious to those skilled in the art from the description herein.

A process has been discovered for purifying cycloserine whereby an aqueous solution of cycloserine is contacted with a water-insoluble cuprous salt to form an insoluble copper-cycloserine compound. The precipitated copper-cycloserine compound is separated from the aqueous portion and then slurried in water. Hydrogen sulfide gas is sparged into the slurry resulting in conversion of the copper-cycloserine to insoluble copper sulfide and soluble cycloserine. The precipitate containing copper sulfide is then separated. Air is sparged through the solution to free it of hydrogen sulfide thereby producing a solution of purified cycloserine. When desired, the cycloserine can be recovered and further purified by known methods.

Detailed description

Cycloserine is conveniently produced by fermentation methods by the cultivation of a cycloserine-producing organism on a nutrient fermentation medium. The process of this invention is particularly suitable for, but not limited to, the recovery of cycloserine from such a fermentation medium. The medium is first filtered or centrifuged to separate suspended solids, such as the cells of the microorganism, and the temperature of the liquid is then adjusted, if necessary, to within 20 to about 30° C., preferably to about 25° C.

The cycloserine solution is then delivered to an inert reaction vessel, and the pH is adjusted with an alkali hydroxide solution to within the range of from 5.0–8.0, preferably from 6.0–6.7. A pH of 6.5 is particularly preferred. During the transfer period and until completion of the reaction period, nitrogen gas is sparged continuously through the vessel and contents to provide a substantially oxygen-free environment. A water-insoluble cuprous salt, preferably the chloride, is added, generally as a powdered solid, with agitation and at a rate which will provide satisfactory suspension without clumping. Preferably, the amount of cuprous salt added is sufficient to provide about 1.5 moles of cuprous copper per mole of cycloserine, although the ratio can be varied within at least 1:1 to about 2:1 with good results. Since copper salts can also react slowly with amino acids and other compounds usually present in the fermentation medium, the ratio of 1.5:1 is preferred to insure an ample supply of cuprous salt for reaction with cycloserine, yet without undue excess.

The water-insoluble cuprous salts suitable for the practice of this invention include chloride, bromide, iodide and thiocyanate. The chloride is generally preferred because it is readily available in the quantities required at a reasonable price. The cuprous salt selected is preferably free from the cupric form and is in powdered form, free from lumps or agglomerates. Several commercial grades of the chloride are available which have given satisfactory results.

During the addition of the cuprous salt and in the period immediately following, the pH is monitored continually and maintained within the range of 6.0–6.7, preferably at about 6.5, by adding 6 N alkali solution as needed. When the pH rate of change is within about 0.1 unit over a ten-minute period, the reaction is determined to be complete.

The alkali used in the pH adjustment can be sodium or potassium hydroxide, sufficiently diluted so that control of pH can be easily accomplished. Generally, a concentration of about 6 N is convenient.

The precipitated copper-cycloserine compound is then separated by any suitable means, i.e. by decantation to form a concentrated slurry, by centrifugation, or preferably by filtration, and the precipitate is washed once and sufficient water, good tap water, or preferably deionized or distilled water, is added to form an easily-managed slurry.

Char, about 1 oz./gal., and filter aid are added to the slurry and the mixture is chilled to about 0–5° C. Gaseous hydrogen sulfide is then sparged through the solution with agitation to precipitate copper sulfide during which step the cycloserine is liberated and redissolves.

The hydrogen sulfide used in the practice of this invention can be commercial hydrogen sulfide delivered from a cylinder or it can be obtained from a hydrogen sulfide generator. The char and filter aid used in this process are preferably of good commercial quality and it is desirable particularly that they be free from iron contamination.

When it has been determined that precipitation of the copper is complete, the precipitate containing copper sulfide is separated, e.g. by filtration, washed, and the washings combined with cycloserine solution. The temperature is maintained at 0–5° C. throughout this step. To the cycloserine solution is added 8-hydroxyquinoline, about 1-3 g./gal., to remove any traces of iron which may be present. Char is again added, about 1 oz./gal., and the mixture is filtered.

The filtrate containing the cycloserine is then sparged with air to remove dissolved hydrogen sulfide until it has been determined that no hydrogen sulfide remains in the solution. One method of determining whether or not the solution is free from hydrogen sulfide is by testing with lead acetate paper. The resulting solution is a relatively pure solution of cycloserine which can be recovered therefrom if or when desired by any suitable means, i.e. by the method of Harned, U.S. Patent 2,789,983.

Generally, conventional processing equipment is employed in the practice of this invention. The reaction vessels used for precipitation of the copper cycloserine complex and for precipitation of copper sulfide with liberation of cycloserine are preferably glass-lined, fiber-glass reinforced plastic or copper. Stainless steel and carbon steel vessels are not satisfactory for continuous use, although stainless steel can be used for short exposures.

The following examples are intended to further illustrate the practice of this invention.

Example 1

Cycloserine was produced by fermentation according to the process of R. L. Harned, U.S. Patent 3,090,730. At the end of the fermentation period, 100 gal. of the "beer," i.e. the nutrient fermentation medium containing the cycloserine and the cells of the microorganism, was filtered to remove the cells. The filtered beer, which contained 2.05 g./l. of dissolved cycloserine, was delivered at a temperature of 25° C. to a 100-gallon glass-lined kettle equipped with an agitator, a thermometer, a pH electrode assembly, a cuprous chloride port and vent, a sodium hydroxide inlet means, an oxygen detector, a nitrogen sparger, a gas vent, a port and sight glass, and a bottom unloading outlet valve.

While the beer was being delivered to the kettle, the agitator was started and nitrogen was introduced through the sparger. The top of the kettle was closed, and when all the beer had been delivered, the pH was adjusted to 6.5 by adding 6 N sodium hydroxide solution. When the oxygen detector showed that the beer was free from oxygen, 1,164 g. of powdered cuprous chloride was slowly added to the solution. The pH was maintained within the range of 6.0 to 6.6 by addition of 6 N NaOH as needed. After a reaction period of about an hour, the pH was changing at a rate of less than 0.1 unit per 10 minutes and the reaction was determined to be complete. The nitrogen flow was shut off, the agitator stopped, and the mixture was allowed to settle for one hour.

The supernatent liquid was drawn off, leaving 2.5 liters of slurry in the reaction vessel. The slurry was then discharged through the bottom outlet valve into a receiver. The reactor was rinsed with a strong stream of water and the rinsing was added to the slurry bringing the total slurry volume to about 10–11 liters.

The slurry was again allowed to settle, the supernatant liquid was drawn off. Crushed ice and water were added to raise the volume to about 20 liters and 300 g. of RB char, manufactured by Pittsburgh Coke and Chemical Company, 8.0 g. of 8-hydroxyquinoline and about 200 g. of perlite filter aid were added. Hydrogen sulfide from a commercial cylinder of hydrogen sulfide was passed into the solution for about 30 minutes, at which time it was determined that the copper from the copper-cycloserine compound had been precepitated as copper sulfide and soluble cycloserine had been liberated.

The precipitate was filtered, the filtrate being maintained at 0–5° C. and the cake was washed.

The filtrate was sparged with nitrogen to wash out dissolved $H_2S$. Assay showed 66.5% yield to this point. The solution of cycloserine was again treated with char and 8-hydroxyquinoline as before. The cycloserine was recovered in crystalline form according to known methods.

Example 2

The fermentation medium, or beer, 4,000 gal., having a cycloserine concentration of 2.2 g./l. is filtered to remove the cells of the microorganism and is passed through a heat exchanger to adjust the temperature to about 25° C., then is pumped into a 4,200 gal. glass-lined, baffled reaction vessel having a closeable top and equipped with a vent, a constant recording pH meter, an agitator and gas sparger. When the vessel is about half full, the agitator is started and nitrogen is introduced through the sparger at a low rate of flow. The top of the tank is closed and when the beer is pumped in, the pH is adjusted to 6.5 with 6 N NaOH. The nitrogen sparge rate is increased for about 30 minutes and a total of about 450 feet$^3$ is used to sweep the reaction vessel free from oxygen.

Cuprous chloride, 110 lb., providing 1.5 lb. cuprous chloride per lb. of cycloserine, is slowly added over a period of 10 minutes. When the pH begins to drop, 6 N NaOH is added at a rate sufficient to maintain the pH above at least 6.0, and as near to 6.5 as possible. After the addition of the cuprous chloride is complete, the pH is maintained between 6.3 and 6.7 by addition of 6 N NaOH as needed. When the pH drop is less than 0.1 unit over a period of 10 minutes, the reaction is determined to be complete. The total reaction period is about an hour.

At the end of the reaction period the agitator and nitrogen flow are turned off and the contents of the vessel are allowed to stand undisturbed for about an hour to allow the precipitated copper-cycloserine compound to settle. Supernatant liquid, 3,800 gal., are decanted and 200 gal. deionized water are added to the solids. The agitator is started and the slurry is filtered. The tank is rinsed with deionized water and the rinsings are filtered, thus acting as a wash for the filter cake.

A 100 gal. glass-lined and jacketed vessel equipped with an agitator is chilled to about 4° C. The copper-cycloserine filter cake is transferred to the vessel, 20 lb. of RB char, manufactured by Pittsburgh Coke and Chemical Company, 7 lb. perlite filter aid, 100 lb. of crushed ice and 40 gal. of deionized water are added to the vessel. The agitator is started and hydrogen sulfide ($H_2S$) gas is sparged into the mixture. When about 52 lb. of $H_2S$ has been added, a sample of supernatant liquid is tested with $H_2S$. No further precipitate is formed, thus indicating that all of the copper is precipitated as copper sulfide.

The slurry is filtered and the filtrate is collected in a cold vessel. The filter cake is washed once and the washing added to the filtrate. The filtrate is sparged with air until lead acetate paper shows it to be free from $H_2S$, then is treated with 8-hydroxyquinoline and char to remove traces of iron and color bodies and is again filtered. The cycloserine is then recovered in pure crystalline form according to known methods.

Example 3

The process of Example 1 is repeated except that cuprous bromide, 1.45 parts, is substituted for cuprous chloride. A high yield of cycloserine is obtained.

Example 4

The process of Example 1 is repeated except that cuprous iodide, 1.93 parts, is substituted for cuprous chloride. A high yield of cycloserine is obtained.

Example 5

The process of Example 1 is repeated except that cuprous thiocyanate, 1.23 parts, is substituted for cuprous chloride. A high yield of cycloserine is obtained.

What is claimed is:

1. A process for the purification of cycloserine by precipitation thereof as a copper compound from an aqueous cycloserine solution comprising the steps of:
   (a) adding to said cycloserine solution at a temperature of from about 20° C., to about 30° C. a water-insoluble cuprous salt selected from the group consisting of cuprous chloride, cuprous bromide, cuprous iodide, and cuprous thiocyanate in a ratio of from about 1 to about 2 moles of cuprous copper in said cuprous salt per mole of cycloserine, while maintaining a substantially oxygen-free environment, to effect precipitation of said copper-cycloserine compound,
   (b) maintaining the pH during step (a) above within the range of from 6.2 to 6.7 by means of incremental addition of an alkali hydroxide solution,
   (c) separating said precipitated copper-cycloserine compound,
   (d) slurrying said copper-cycloserine compound in water at a temperature of 0–5° C.,
   (e) adding hydrogen sulfide to the said slurry to effect the precipitation of the copper as copper sulfide and to liberate cycloserine in solution from said copper-cycloserine compound,
   (f) separating said copper sulfide from said cycloserine while maintaining the temperature at 0–5° C.,
   (g) sparging air through said cycloserine solution to effect removal of said hydrogen sulfide, and
   (h) recovering said cycloserine.

2. The process of claim 1 wherein the cuprous salt is cuprous chloride.

3. The process of claim 1 wherein the cuprous salt is cuprous bromide.

4. The process of claim 1 wherein the cuprous salt is cuprous iodide.

5. The process of claim 1 wherein the cuprous salt is cuprous thiocyanate.

6. The process of claim 1 wherein the pH is maintained within the range of from about 6.4 to about 6.6.

References Cited

UNITED STATES PATENTS

| | | | |
|---|---|---|---|
| 2,789,983 | 5/1957 | Harned | 260—307 |
| 3,124,590 | 3/1964 | Harned | 260—307 |
| 3,130,198 | 4/1964 | Harned | 260—307 |

ALEX MAZEL, Primary Examiner

R. V. RUSH, Assistant Examiner